Oct. 9, 1923.
B. HALL
1,470,563
VARIABLE SPEED MECHANISM
Filed May 21, 1913
5 Sheets-Sheet 1
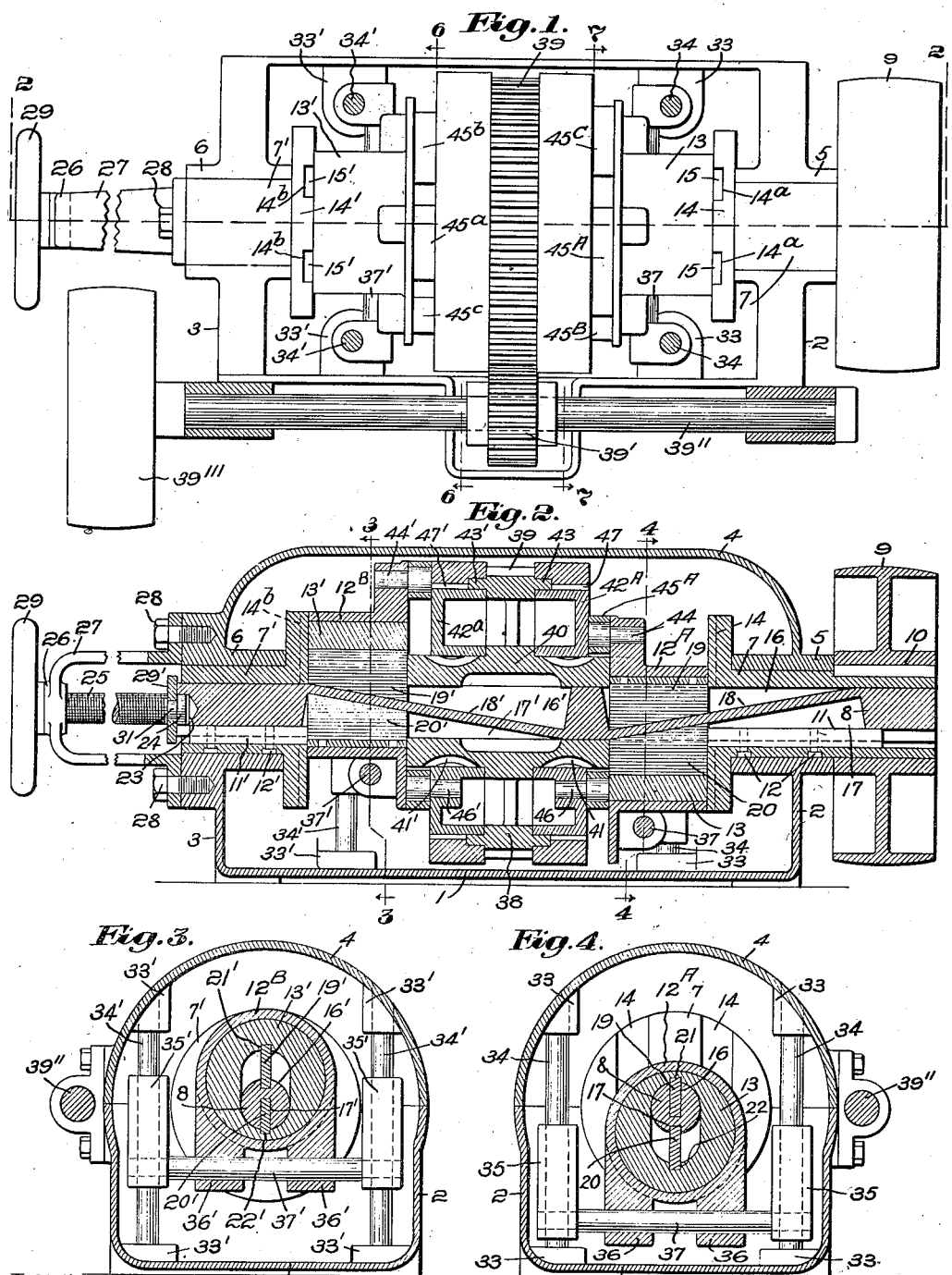
Witnesses:
Horace A. Croseman
Carl L. Choate
Inventor:
Bicknell Hall.
by Emery, Booth, Janney & Varney
Attys.

Oct. 9, 1923.

B. HALL 1,470,563

VARIABLE SPEED MECHANISM

Filed May 21, 1913

Witnesses:
Horace A. Crossman
Carl L. Choate

Inventor:
Bicknell Hall.
by Emery, Booth, Janney & Varney,
Attys

Oct. 9, 1923.
B. HALL
1,470,563
VARIABLE SPEED MECHANISM
Filed May 21, 1913
5 Sheets-Sheet 3
Fig. 9.
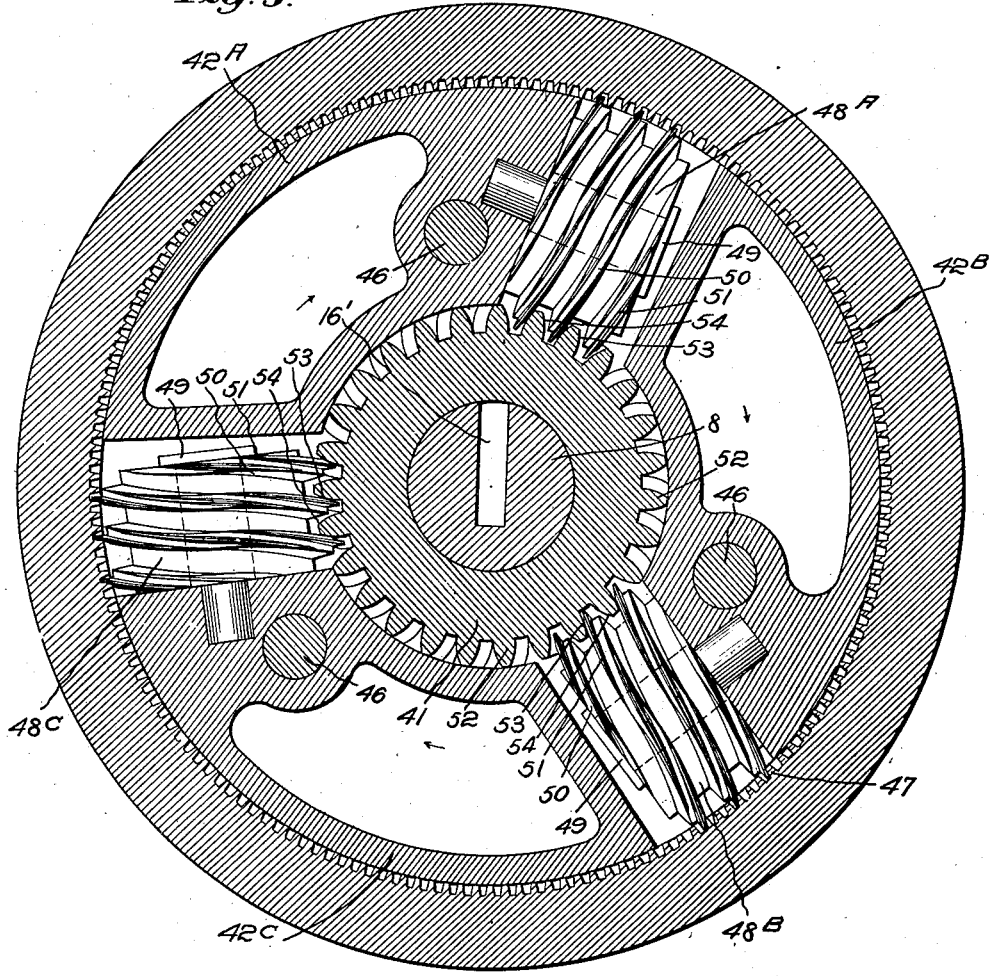
Fig. 9ᵃ
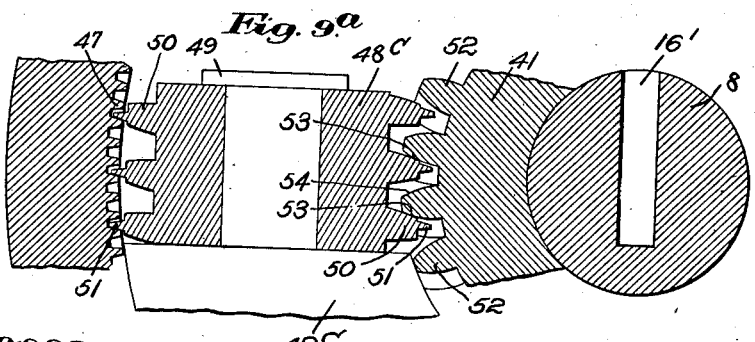
Witnesses
Horace A. Grossman
Carl L. Choate
Inventor:
Bicknell Hall.
by Emery, Booth, Janney & Varney,
Attys.

Oct. 9, 1923.
B. HALL
1,470,563
VARIABLE SPEED MECHANISM
Filed May 21, 1913
5 Sheets-Sheet 4
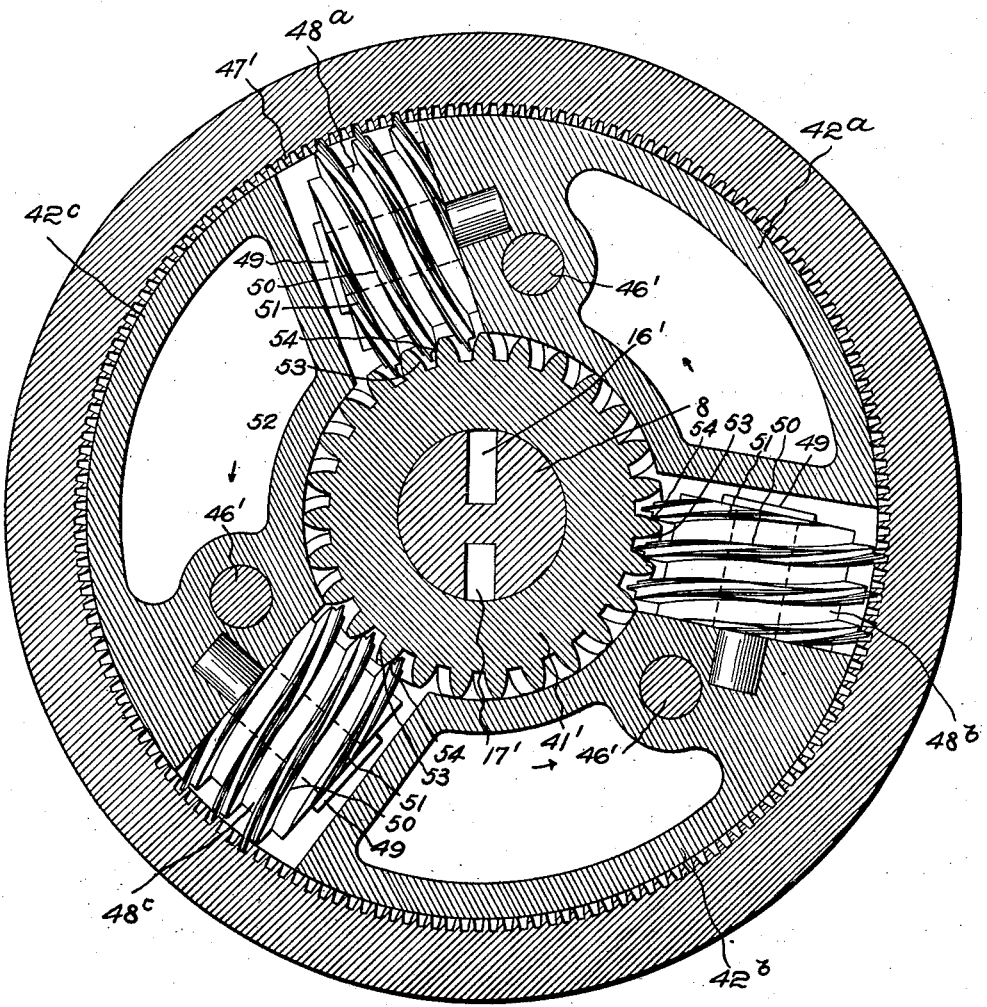

Oct. 9, 1923.
B. HALL
1,470,563
VARIABLE SPEED MECHANISM
Filed May 21, 1913
5 Sheets-Sheet 5
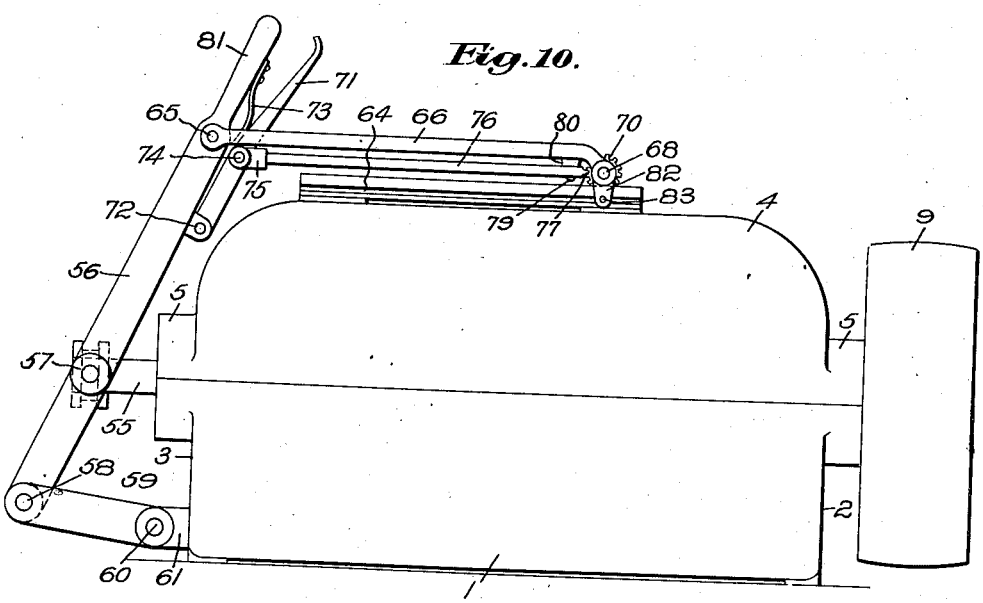
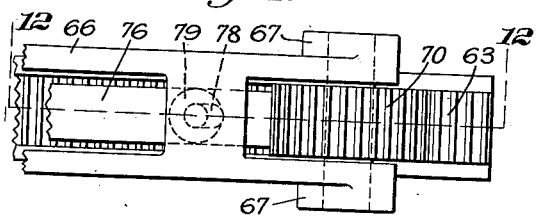
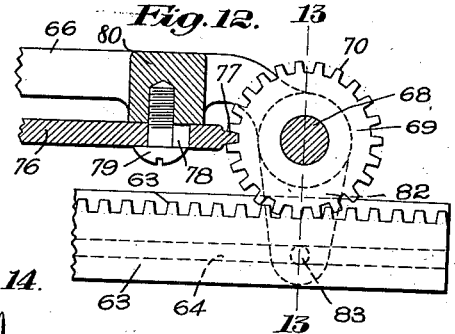
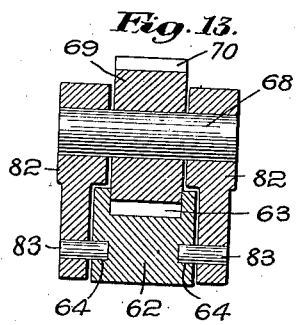
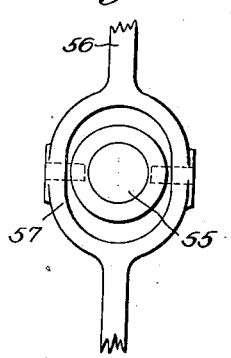
Witnesses:
Horace A. Crossman
Carl L. Choate
Inventor:
Bicknell Hall
by Emery, Booth, Janney & Varney
Attys.

Patented Oct. 9, 1923.

1,470,563

UNITED STATES PATENT OFFICE.

BICKNELL HALL, OF TAUNTON, MASSACHUSETTS, ASSIGNOR TO HALL CO., OF BOSTON, MASSACHUSETTS, A CORPORATION OF MASSACHUSETTS.

VARIABLE-SPEED MECHANISM.

Application filed May 21, 1913. Serial No. 768,998.

*To all whom it may concern:*

Be it known that I, BICKNELL HALL, a citizen of the United States, and a resident of Taunton, in the county of Bristol and State of Massachusetts, have invented an Improvement in Variable-Speed Mechanism, of which the following description, in connection with the accompanying drawings, is a specification, like characters on the drawings representing like parts.

This application is a continuation in part and as to certain common subject matter of my copending application Serial No. 507,616 filed July 14, 1909, renewed as application Serial No. 204,100 on November 26, 1917 and of which latter my application Serial No. 240,325 filed June 17, 1918 is a refiling, and also is a continuation in part and as to certain common subject matter of my copending application Serial No. 610,295 filed February 23, 1911, renewed as application Serial No. 157,248 on March 24, 1917 and of which latter my application Serial No. 194,012 filed September 29, 1917 is a continuation.

This invention relates to variable speed mechanism, an important object thereof being to provide an improved, simplified and compact construction. The nature of my invention will best appear from a description of a single embodiment thereof selected for illustrative purposes and shown in the accompanying drawings, wherein—

Fig. 1 is a plan view of a speed varying mechanism embodying my invention, the top of the casing being removed;

Fig. 2 is a vertical longitudinal section of the mechanism shown in Fig. 1;

Fig. 3 is a vertical transverse section upon the line 3—3 of Fig. 2 looking toward the left in said figure;

Fig. 4 is a similar view upon the line 4—4 of Fig. 2 looking toward the right in said figure;

Fig. 9 is an enlarged view in transverse vertical section taken through the driven element, at the right of a median line viewing Fig. 2;

Fig. 9ª is a detail view in vertical section, of a portion of the construction shown in Fig. 9;

Fig. 9ᵇ is a view similar to Fig. 9 at the left of the median line referred to;

Fig. 9ᵇ is an enlarged view in transverse vertical section taken through the opposite driven element from that shown in Fig. 9;

Fig. 10 is a side elevation of the encased mechanism and representing a modified form of means for varying the eccentricity of the rings;

Fig. 11 is a detail representing in plan the right hand portion of the speed varying structure shown in Fig. 10;

Fig. 12 is a longitudinal central sectional view upon the line 12—12 of Fig. 11;

Fig. 13 is a transverse sectional view upon the line 13—13 of Fig. 12; and

Fig. 14 is a detail showing the connection between the adjusting lever and drive shaft.

Figure 8:
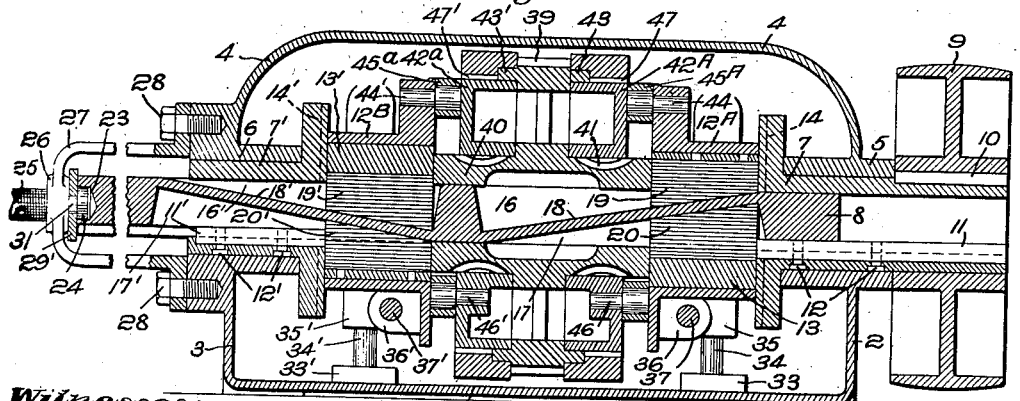
Fig. 8 is a view similar to Fig. 2, but representing the eccentric rings as concentrically positioned with respect to the driving shaft.

Referring first to Figs. 1 to 8 inclusive, upon a suitable base 1, as shown in Figs. 2 and 8, there are erected two end standards 2, 3, which may be integral with or attached to the base and which form a portion of the enclosing casing, the overlying portion or top of which is indicated at 4 in said figures. At suitable aligned points in said standards 2, 3 are provided bearings 5, 6, within which are mounted two end bushings 7, 7', the bushing 7 being positively driven as hereinafter described and the bushing 7' being rotatable through the mechanism interposed between said bushings and hereinafter described. Mounted within the bushings 7, 7' is a driving shaft 8, the right hand end whereof, viewing Fig. 2, projects beyond the casing. Upon said outer end of the bushing 7 is fast a driving pulley 9, it being represented as secured thereto by a key 10 of any suitable construction. Positioned within the bushing 7 is a feather 11, secured to the bushing by a suitable number of screws 12, thereby preventing displacement of the bushing upon axial movement of the drive shaft 8. Similarly the bushing 7' is provided with a feather 11' secured in position by screws 12'. Thus the driving pulley 9 is keyed to the bushing 7, and the latter is keyed to the driving shaft 8, so that the said shaft is driven directly by the bushing and indirectly by the said driving pulley 9. This relieves the driving shaft of undue torsional strain.

I contemplate the provision in connection with the driving shaft and an element driven thereby of one or more preferably ring-like members capable of adjustment into varying positions of eccentricity, and by adjustment of which any desired variation in speed of the driven member is effected. Preferably I employ a pair of such members and in this embodiment of the invention have represented the use of a pair thereof, oppositely positioned or balanced upon the driving shaft 8. Within the scope of the invention, however, any suitable number thereof may be employed.

The said adjustable members, herein shown as rings are represented at 12$^A$, 12$^B$ in the several figures, and are mounted upon or carried by the eccentrics 13, 13'. The latter are positioned upon the driving shaft and are respectively at the inner ends of the bushings 7', 7, each of which latter is provided with an inner head or flange 14 or 14' grooved on its face as indicated at 14$^a$, 14$^b$, as indicated most clearly in Figs. 1 and 2. Each of said eccentrics 13, 13' is provided with a pair of ears or projections 15, 15' adapted to enter said grooves, as indicated most clearly in Fig. 1, thereby insuring unitary rotation of said bushings and the said eccentrics, while permitting radial movement of the latter with respect to the former.

I contemplate the provision of suitable means for varying the eccentricity of the said eccentrics 13, 13', or of wholly eliminating the same, thereby, through the driving rings 12$^A$, 12$^B$, to obtain any desired speed of the driven element, or to bring the same into a position of rest.

For this purpose, I have herein represented the driving shaft 8 as having a pair of diametrically opposed key-ways, tapered or wedged shaped in longitudinal section. As shown most clearly in Figs. 2, 3 and 4, that portion of the shaft 8 adjacent to the bushing 7 and the eccentric 13 and receiving the same, in the position of the parts shown in Fig. 2, is provided with a diametrically opposed pair of key-ways 16, 17 oppositely tapering in longitudinal section, and that portion of the said shaft similarly adjacent to the bushing 7' and the eccentric member 13' and receiving the same, in the position of the parts shown in Fig. 2, is provided with a similar but reversed pair of key-ways 16', 17'.

In each instance, I have represented each key-way as extending at its deepest point nearly through the shaft 8, each pair of key-ways being separated by a relatively thin web 18, 18'. Within each of the key-ways is received a wedge or key, indicated at 19, 20 and 19', 20', and each having an inclined inner edge corresponding to the inclination of its key-way.

Each eccentric 13, 13' is axially recessed to permit its eccentricity to be varied and is provided with two longitudinal key-ways 21, 22, 21', 22' respectively, of a sufficient depth to receive the wedges 19, 20, 19', 20' respectively, and to permit the radial movement thereof caused by the axial movement of the driving shaft hereinafter described. The form and construction of these features may be widely varied within the scope of the invention.

Figure 5:
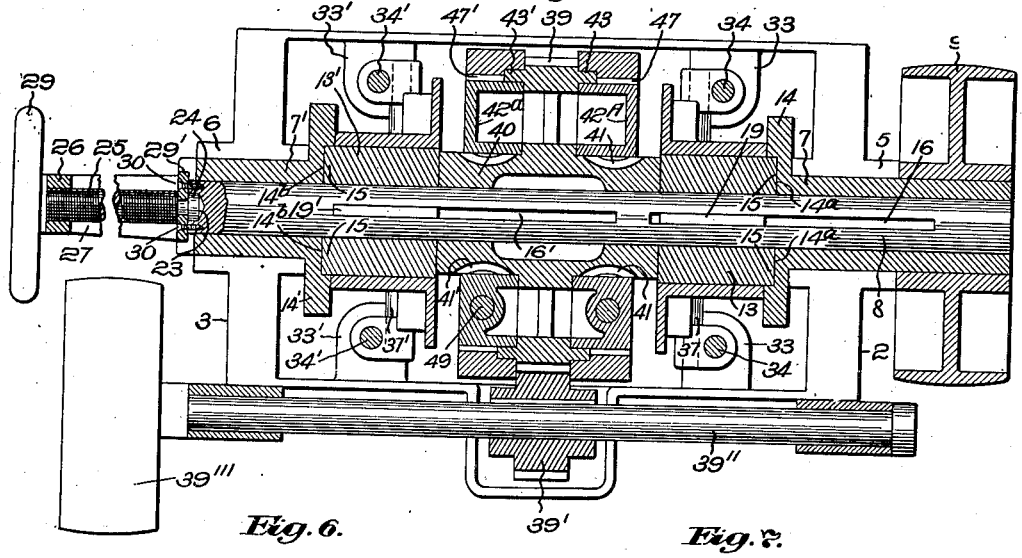
Fig. 5 is a central horizontal section of the mechanism shown in Fig. 1.

I provide any suitable means for axially moving the driving shaft 8, thereby to project the wedges 19, 20, 19', 20'. For this purpose I have in Figs. 2, 5 and 8 represented the left hand end of the said drive shaft as axially socketed at 23 for the reception of the end 24 of a screw 25 mounted in a fixed nut 26 which is itself secured to the casing by a yoke 27 and bolts 28. The outer end of the screw 25 is provided with a hand wheel 29 fast thereon. The end 24 of the screw 25 is seated for rotation in the socket 23 of the driving shaft 8, and in order to confine the screw in said socket while permitting such rotation, I have herein represented, as shown most clearly in Figs. 2 and 8, a plate 29' secured by screws 30 to the end of the shaft 8 and provided with an opening 31 of less size than the diameter of the screw 25 and engaging a portion thereof of reduced diameter, as indicated in Fig. 2. For convenience in assembling the parts, the plate 29' may be made in two pieces if desired.

Rotation of the screw 25 by the hand wheel 29 (when the parts are in the position shown in Fig. 2), will move the said screw and the driving shaft 8 axially to the left, viewing Fig. 2, without rotation of said shaft, and will cause the webs 18, 18' to force the wedges 19, 20' radially outward and permit the wedges 20, 19' to move radially inward to a corresponding extent with corresponding change in the eccentricity of the eccentrics 13, 13'. The amount of axial movement of the driving shaft 8 determines the extent of radial projection of the wedges 19, 20', and therefore determines the amount of eccentricity of the said eccentrics and consequently the speed of the driven element.

Axial movement of the driving shaft 8 in the opposite direction will force the wedges 20, 19′ radially outward and permit the corresponding retraction of the wedges 19, 20′. In this manner, the eccentrics 13, 13′ may be positioned concentrically with the driving shaft 8 (as indicated in Fig. 8), thereby bringing the driven element to a position of rest or the eccentricity of the eccentrics may be varied to any desired extent within the capacity of the mechanism, thereby obtaining any desired speed of the driven element.

The driving rings 12$^A$, 12$^B$ which encircle the eccentrics 13, 13′ are moved in a gyratory manner with respect to the driving shaft 8 by the rotation of the said eccentrics, but are themselves confined or held from rotation about said shaft in any suitable manner. For this purpose, I have, in Figs. 2, 3 and 4, represented the casing as provided with internal projections 33, 33′ having sockets wherein are mounted guiding posts 34, 34′ receiving thereon sliding sleeves 35, 35′. The driving ring 12$^A$ is provided with a pair of projecting lugs or ears 36 and the driving ring 12$^B$ is provided with a corresponding pair of lugs or ears 36′. Loosely passing through said ears 36, 36′ are rods 37, 37′, the ends whereof are received in suitable sockets in the sleeves 35, 35′. Rotation of the eccentrics 13, 13′ compels gyratory movement of the driving rings 12$^A$, 12$^B$. Said rings are, however, as stated, held from rotation by the rods 37, 37′, upon which the ears 36, 36′ slide, and in such gyratory movement of the rings 32, 32′ the sleeves 35, 35′ slide to and fro along the rods 34, 34′.

Loosely mounted upon the driving shaft 8 between the eccentrics 13, 13′ is the driven element 38 which is here represented as an annular member or gear having external teeth 39. The casing is provided with a suitable opening to permit the teeth 39 of the driven element 38 to mesh with any suitable element or part to which motion is to be transmitted, as for example to the pinion 39′ upon the shaft 39″ shown in Fig. 1, and having thereon a transmission pulley 39‴.

The driven element 38 is provided with a hub 40 within which is loosely received the driving shaft 8 and which at its ends abuts against the eccentrics 13, 13′ and the driving rings 12$^A$, 12$^B$. The teeth 39 of the driven element 38 are positioned substantially mid-length the hub 40.

At each side of the gear portion proper of the driven element 38, the hub 40 is circumferentially toothed, as indicated at 41, 41′, the said teeth constituting worm gears, as most clearly shown in Fig. 9$^a$. These two series of teeth extend circumferentially about the hub, and in this embodiment of the invention the teeth are represented as cut or otherwise suitably formed from the centre of the driving worms hereinafter described and with which they intermesh.

Loosely mounted upon the hub 40 at opposite sides of the gear portion thereof, are two sets or series of segments 42$^A$, 42$^B$, 42$^C$ and 42$^a$, 42$^b$, 42$^c$ (Figs. 9 and 9$^b$). Any suitable number of segments may be provided in each series but in the disclosed embodiment thereof I have represented three segments in each series. These segments are mounted in opposite, annular guide-ways formed in the driven element 38, such guide ways being constituted by the hub 40 and the flanges 43, 43′ extending from the faces of the driven element 38 as shown most clearly in Fig. 2.

Figures 6, 7:
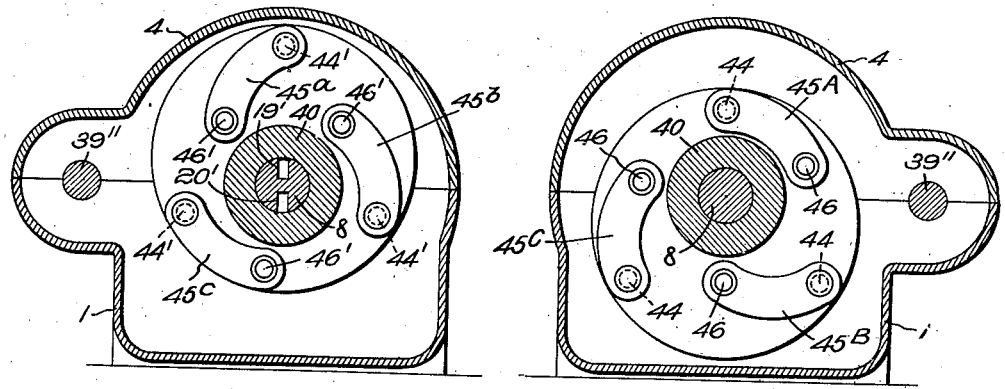
Fig. 6 is a vertical transverse section upon the line 6—6 of Fig. 1 looking toward the left in said figure.
Fig. 7 is a similar view upon the line 7—7 of Fig. 1 looking toward the right in said figure.

Each of the gyratory driving rings 12$^A$, 12$^B$ is provided with a series of studs 44, 44′ corresponding in number to the segments 42$^A$, 42$^a$, etc., and pivotally mounted upon said studs are a corresponding number of links 45$^A$, 45$^B$, 45$^C$, and 45$^a$, 45$^b$, 45$^c$, shown most clearly in Figs. 6 and 7. The opposite ends of said links 45$^A$, 45$^a$, etc., are pivotally connected to a corresponding number of studs 46, 46′ upon the segments 42$^A$, 42$^a$, etc.

Since the eccentrics or eccentric bearings 13, 13′ and their respective rings 12$^A$ and 12$^B$ are oppositely disposed upon the shaft 8 it follows that the studs 44 of one series of links lie intermediate the respective studs 44′ of the other series, this same arrangement also being true of the studs 46, 46′ at the outer ends of said links, and also of the segments themselves.

The described gyratory movement of the driving rings 12$^A$, 12$^B$ is transmitted through the links 45$^A$, 45$^a$, etc., to the segments 42$^A$, 42$^a$, thereby moving them each intermittently and sequentially in opposite directions in curved paths, and in an oscillatory or to and fro manner.

The driven element 38 is provided with two annular series of internal teeth 47, 47′ indicated in Figs. 2 and 8, one series thereof being shown in detail in Fig. 9. The teeth of the internal gears 47, 47′ are inclined at a suitable angle, thus constituting internal worm gears, as indicated in Figs. 8, 9 and 9$^b$, to correspond to the inclination of the teeth of the worms 48$^A$, 48$^B$, 48$^C$, 48$^a$, 48$^b$, 48$^c$, and with which they mesh as set forth. Each of the segments 42$^A$, 42$^a$, etc., is provided with one of said worms, one series of said worms being shown in plan in Fig. 9 and the other series being shown in plan in Fig. 9$^b$. Each of said worms is loosely mounted upon a stud 49 secured in any suitable manner in a socket in the forward end of the corresponding segment 42$^A$, etc. In my effort to provide an improved variable speed transmission I have found that universality of speed adjustment; positive drive—a drive free from heat generating friction; and a reasonably economical and efficient construction are greatly promoted by arranging the lines of driving thrust within or between the angles of repose flanking a line normal to the engaged face, thus availing of the area of repose within said angles for reliable and efficient transmission, and at the same time availing of the non-slip advantage that can only be had by utilizing a line of driving thrust within said repose area. Accordingly each worm 48$^A$, etc., is provided with a main thread 50 extending any suitable number of times about the worm but of such a steep pitch, that is, slow or small pitch that its intermeshing, driving engagement with the worm gear 41, 41', cannot compel rotation of said worm, but on the contrary compels rotation of the driven element 38 wherein are formed the worm gears 41, 41'. Each main thread 50 is provided with a series of relatively short, that is, small supplemental threads 51, as shown most clearly in Figs. 9, 9$^a$ and 9$^b$. The pitch of the supplemental threads is greater than the pitch of the main thread 50 and corresponds to the inclination of the internal teeth 47, 47', and is such as to compel rotation of said worms as hereinafter set forth; that is; the angle of the engaging surfaces of said small threads exceeds the angle of repose.

The teeth of the main thread 50 enter between the teeth 52 of the gears 41, 41', as represented most clearly in Figs. 9, 9$^b$. The width and inclination of the main threads 50 is such with relation to the spacing of the teeth 52 of the gears 41, 41' that the spires or teeth of the said main thread 50 engage one side of a plurality of said teeth and have clearance at the other side of said teeth, as shown most clearly in Figs. 9, 9$^b$. In the position of the parts shown in said Fig. 9, and at all times the leading faces of the spires or teeth of the main thread 50 engage the rear faces 53, 53 of a series of the teeth 52, and there is clearance between the rear faces of said spires or teeth and the leading faces 54 of said series of teeth 52. The described relation or engagement of the leading face of the spires or teeth of the main thread 50 with the rear faces of a series of teeth 52 constitutes the effective driving relation of the said worms with respect to the gears 41, 41'. During this described driving relation of the worms 48$^A$, 48$^a$, etc., with the gears 41, 41', and at all times the supplemental threads 51 of the said worms have clearance with the rear faces of those internal teeth 47, 47' with which the worms are in mesh and contact with the leading faces of said teeth, as represented in Fig. 9.

When the segments 42$^A$, 42$^a$, etc., are moved forward by the driving rings 12$^A$, 12$^a$, in the manner described, the leading faces of the spires or teeth of the thread 50 engage being in engagement with the rear faces of the series of teeth 52, and inasmuch as the pitch of the thread 50 is too steep, that is, small and with the thrust line within the angle of repose to permit rotation of the worms, the latter are held from rotation and consequently act as drivers to the gears 41, 41'.

Thus at each forward movement of each of the segments, the worm thereof acts as a driver and imparts rotative movement to the gears 41, 41' as the case may be. Upon the return movement of each segment, owing to the described clearance, the spires or teeth of the main threads 50 of that segment cease from effective driving engagement with the rear faces of the teeth 52 although remaining in contact or substantially in contact therewith, and the supplemental threads 51 being in engagement with the leading faces of a series of the internal teeth 47, 47' cause the consequent idle rotation of the worm of that segment, which permits the return of said segment to its former position. This rotation of the worms is a contraclockwise rotation in Fig. 9. Thus in the forward movement of any segment, its worm is held from rotation and acts as a driver, and upon the return or inactive movement of each segment, the worm rotates freely in a contraclockwise direction, (viewing Fig. 9) but does not act as a driver. While each worm is acting as a driver, it has no rotative movement, and thus all friction incident to rotation while acting as a driver, is avoided. Thus each worm partakes of the general nature of a ratchet but "picks up" anywhere, so that an intermittent or ratchet movement of any desired extent is thus secured. Furthermore, the action of the worms is noiseless and absolutely positive.

The large teeth of small pitch of the worm and its worm gear and the small teeth of large pitch and their gear are so proportioned that the worm would turn the driven element 38 at the same speed if either were driving; in other words, if the large pitch worm were so designed to make ten turns of the worm to one of the gear 38, the small pitch must be designed ten to one if those teeth were driving. Within the scope of my invention such mechanism may be employed in substitution for the so-called "differential," employed in automobiles and other mechanisms, being peculiarly serviceable for such purpose.

With the described construction, it will be understood that the driven element 38 is constantly driven in the same direction at a speed depending upon the eccentricity of the eccentric elements 13, 13', which, as previously described, may be varied within the limits of the mechanism, thus providing for any speed in the same direction. Inasmuch as the eccentric elements 13, 13' are oppositely mounted upon the driving shaft 8 and with the segments and their worms of one set consequently intermediate those of the opposite set, as above described and as is clear from the drawings particularly by comparing Figs. 6 and 7 and Figs. 9 and 9ᵇ, it follows that during the return movement of any or all the segments of one set of segments, some one segment and worm of the other set of segments is acting as driver, at all times a worm or worms of one set or the other being effective to drive. Therefore, the rotation of the driven element 38 is continuous. By circumferentially shifting the internal gears 47, 47' by means not shown, but which may be applied thereto for manual or other operation, I may effect a change in the direction of rotation of the driven element 38 without change in the direction of rotation of the driving shaft.

The construction shown in Figs. 1 to 8 inclusive for axially adjusting the driving shaft 8 is preferred, because of its simplicity, but the invention is not limited thereto. If the mechanism be mounted overhead, then the hand wheel 29 may be replaced by a sprocket gear carrying a depending sprocket chain, which may be seized and drawn upon to effect rotation of such sprocket gear and axial adjustment of the shaft 8, thereby varying the speed of the driven element 38.

Any suitable means may, however, be provided axially to adjust the driving shaft 8, so as to vary the speed of the driven element, although it will be understood that within the scope of the invention, the speed of the driven element may be varied in any suitable manner.

In Figs. 10 to 14 inclusive, I have shown one other form of mechanism involving the use of a hand lever, thus adapting the mechanism for convenient use with automobiles or the like.

In said figures, the shaft 8 is represented as provided with an extension 55, to which a lever 56 is connected by a yoke 57 and pin in said lever so as to allow the shaft to turn. Said lever at its lower end is pivoted at 58 to a link 59 itself pivoted at 60 upon a lug 61 projecting from one end 3 of the casing 4.

Upon the top of the casing 4 is formed or secured a longitudinally extending rib, flange or projection 62 having teeth upon its upper edge, as indicated at 63. The opposite faces of said projection are provided with guiding grooves 64, 64.

Pivotally secured at 65 to the operating lever 56 near its upper end, is a link 66, which at its outer end is forked, as indicated most clearly in Fig. 11, and is there provided with bearings 67, 67, within which is loosely mounted the stud shaft 68 of a pinion 69, the teeth 70 whereof mesh with the teeth 63 of the longitudinal projection 62.

The operating lever 56 is provided with a latch member 71 pivoted to the said lever at 72 and normally outwardly pressed by a spring 73 shown in Fig. 10. The latch member 71 has pivoted thereto at 74 a socket piece 75 mounted wherein is a rod 76, the forward end of which has a locking tooth 77 adapted to enter between the teeth of the pinion 69 and hold the same from rotation. In order to support the forward or outer end of the rod 76, I have herein represented it as provided with an elongated slot 78 through which passes a screw 79 tapped into a squared portion 80 of the link 66. The construction is such as to permit a sliding movement of the rod 76 and the withdrawal of the locking tooth 77 from between the teeth of the pinion 69 when it is desired to impart axial movement to the driving shaft 8.

In order to change the speed of the driven element 38, the handle 81 and latch member 71 are grasped, the latch member being swung upon its pivot sufficiently to withdraw the locking tooth 77 from between the teeth of the pinion 69. This unlocks the pinion 69 and permits it to move rotatively along the projection 62 with the consequent axial movement of the shaft 8 to the desired extent. In order to hold the pinion 69 in its proper relation to the projection 62, I have represented the stud shaft 68 of the pinion 69 as provided with depending ears 82 having pins 83 which enter the longitudinal guide grooves 64 of the projection 62.

In the device illustrated herein the driving belt is applied to the driving pulley 9 which, with its shaft 8 and eccentric bearings 13 and 13' and their rings 12ᴬ, 12ᴮ, transmit rotary motion to and through the other parts of the device; hence said driving pulley, its shaft, eccentric bearings and rings may together be considered as the driving element, or any one of them might be so considered. The bearings 13, 13', as stated, are herein driving elements, being positioned upon and actuated by and with the shaft 8 which herein is rotated, and the axes of said driving elements are adjustable as to their eccentricity relatively to both the drive shaft and to the driven element 38.

In the device illustrated, power is taken from the annular member or gear 38 through the gear teeth 39 which gear and its parts in the present form of my invention is the driven element of the device and the axes of this driven element and of the driving elements 13, 13' heretofore mentioned are relatively adjustable into positions of greater or less eccentricity.

Operatively interposed between the driving and driven elements are the groups of segments and their worms and which serve to transmit motion and power from the driving element to the driven element. Each segment and worm together with its link which moves it, constitute one form of what may conveniently be termed a driving unit for transmitting motion from the driving to the driven elements. The driving units of each group are herein distributed in a single plane about the axes of the driving and driven elements and are operatively connected through their links and studs with one of said elements, herein the driving element, in a crank-like manner, that is to say, as the driving pulley 9 is rotated it causes the axis of the driving elements 13, 13'—the axis that is adjustable eccentrically—to describe a movement like a crank which furnishes the connection between said driving element and the driving unit or units.

With the eccentric bearings 13, 13' adjusted into eccentric positions, the outer portions of each driving unit where its worm engages the teeth 52 of the driven element 38, have intermittently effective driving engagement with said element and the points of such engagement change or are adjustable around the pitch line circle or circumference of said element since at each succeeding driving engagement said worm engages a new tooth or teeth more or less removed from that or those previously engaged, the points of engagement progressing around the said driven element in steps determined as to the period, spacing or rapidity of engagement according to the extent of relative eccentricity of the axes of the driving and driven elements above mentioned. Thus while the effective driving engagement of any worm is intermittent, it varies in duration according to the extent of said relative eccentricity and according to the variation of transmission obtained thereby or therefrom.

An important characteristic of the transmission device described is that the driving action or thrust of the driving unit to and upon the driven element is in a line substantially normal to the abutment receiving face formation on the driven element with which it is engaged during the driving period; that is, the thrust line of a driving unit lies within the angles of respose flanking a line normal to the face of said abutment formation which receives it. In the present instance that abutment formation is the effective face or faces of the worm teeth on the driven element, said teeth providing a plurality of engaging faces of limited extent with which the driving units progressively have intermittently effective driving engagement. Said arrangement, that permits the driving thrust to be thus delivered upon the abutment face of the driven element in a line substantially normal to said face and provides an abutting contact between the driving unit and engaged element, renders the device in effect positive in its action in that it is free from heat generating conditions that characterize any clutch or gripping arrangement for delivering the driving thrust from the driving unit to the driven member in any other than a substantially normal line with respect to the engaged member.

If the driving thrust were exerted in a direction not substantially normal to the abutment face or formation of the element engaged by it, the moment the angle of repose at either side a line truly normal to that abutting face would be passed, the driving thrust would tend to produce a lateral slipping action between the driving unit and said face, which would require resistance by some friction clutch or other device. So long, however, as the driving thrust is within the angles of repose at either side of a line truly normal to the abutment face, said line of thrust may be said to be substantially normal to said face and may be employed as freely as if it were a true normal to deliver positive or direct driving force from one part to its engaged part without liability to lateral slip and without requiring any supplementary clutches or other devices to maintain the engagement, in which sense the device is positive in its action.

By the provision of worm gearing, as herein shown, in the engagement of the driving units and their engaged element the range of adjustment in speed due to relative adjustment of the axes of the driving elements 13, 13' and driven element into positions of greater or less eccentricity is rendered truly universal, so that any intermediate speed may be obtained from minimum to maximum. For each driving unit there is provided a continuous face, herein the driving face of the worm, of a length to reach from one to another of the points of intermittently effective engagement of the co-operating face, that is, herein, from one to another tooth of the worm gear. By such an arrangement the driving units may have driving contact with said engaged element at any point circumferentially thereof and in any relative positions of the axes of the driving elements 13, 13' and driven element, and accordingly the speed obtained is universally variable by increments of any desired size. This is due to the capacity of said driving units and their engaged element universally to be adjusted relatively circumferentially about the axis of said engaged element throughout a complete circle.

As already observed, the points of engagement of the driving unit with the engaged element shift variably around the latter according to the extent of said relative eccentricity. They also vary according to the radial position of the points of connection of the driving units with the driving rings 12^A, 12^B relative to the axis of the drive shaft and of the driven element. The driving units, it will be noted, are always positively held and guided, herein by the annular guideways in the driven element 38.

Having thus described one illustrative embodiment of my invention, I desire it to be understood that although specific terms are employed, they are used in a generic and descriptive sense and not for purposes of limitation, the scope of the invention being set forth in the following claims:

1. Variable speed mechanism comprising in combination a drive shaft, a member of variable eccentricity positioned thereon and moved thereby, a driven element concentric with said shaft and provided with worm gearing, a circumferential series of worms engaging said worm gearing and adapted when oscillated to rotate the same in one direction, and operating connections between said worms and said member of variable eccentricity whereby rotation of said shaft and attendant eccentric movement of said member causes oscillatory movements of said worms of a length dependent upon the eccentricity of said member.

2. Speed varying mechanism comprising in combination, a drive shaft, eccentric elements operatively related thereto, means to vary the eccentricity thereof, gyratory rings therefor, cooperatively related thereto and adapted to be positioned thereby, and means to restrain the latter from rotation, a driven element and worm drive gearing between said rings and driven element.

3. Speed varying mechanism comprising in combination, a drive shaft, adjustable eccentrics thereon, wedge means for varying the adjustment of said eccentrics, a driven element concentric with said drive shaft and worm means between said eccentrics and said driven element.

4. Speed varying mechanism comprising in combination, a drive shaft, opposed eccentrics operatively related thereto, a driven element co-axial with said drive shaft and interposed worms and segments carrying the same between said opposed eccentrics and said driven element.

5. Speed varying mechanism comprising in combination, a drive shaft, eccentric elements 13, 13' thereon, gyratory rings 12^A, 12^B, cooperatively related thereto and adapted to be positioned thereby, means to restrain said rings from rotation, a driven element 38 having a hub 40 loose upon said drive shaft, segments 42^A, 42^B, 42^C and 42^a, 42^b, 42^c, operatively related to said gyratory rings, and worms 48^A, 48^B, 48^C and 48^a, 48^b, 48^c, carried by said segments respectively and having intermittent driving relation to said driven element.

6. Variable speed mechanism comprising in combination, a drive shaft, a variable eccentric upon and operatively connected thereto, a circumferential series of segments oscillatable by said eccentric, a driven element coaxial with said shaft, and worm means to transmit motion from said segments to said driven element thereby to rotate the latter in a given direction.

7. Transmission mechanism comprising in combination, a drive shaft, a driven element concentric therewith and a circumferential series of worm drive members between and operatively related to said driving shaft and said driven element.

8. Transmission mechanism comprising in combination, a drive shaft, a driven element mounted concentric thereon, a drive transmission worm therebetween and means controlled by said drive shaft to impart to and fro movement to said drive transmission or worm thereby to impart motion to said driven element in one direction.

9. Transmission mechanism comprising in combination, a drive shaft, a driven element loose thereon, a circumferential series of worms therebetween and operatively connected thereto, and means controlled by said drive shaft for imparting to and fro movement to said worms.

10. Transmission mechanism comprising in combination, a drive shaft, a driven element concentric therewith, operative connections between said drive shaft and driven element and including a toothed hub and an internally toothed ring, and one or more worms between and meshing with the teeth of said hub and ring.

11. Transmission mechanism comprising in combination, a drive shaft, a driven element concentric therewith, operative connections between said drive shaft and driven element and including a toothed hub and an internally toothed ring, one or more worms between and meshing with the teeth of said hub and ring, and means for imparting to and fro movement to said worms.

12. Transmission mechanism comprising in combination, a drive shaft, a driven element loose upon said drive shaft, a worm therebetween and operatively connected thereto, means to impart to and fro movement to said worm, said worm being non-rotative during movement in one direction and being rotative during movement in the opposite direction.

13. Transmission mechanism comprising in combination, a drive shaft, a driven element loose upon said drive shaft, a plurality of worms for transmitting movement to said driven element from said drive shaft, means controlled by said drive shaft to impart to and fro movement to said worms, said worms being non-rotative during the driving portion of their to and fro movement.

14. Speed varying mechanism comprising in combination, a drive shaft, a driven element coaxial therewith, driving connections between said drive shaft and driven element including worm gearing for said driven element having a driving movement and an opposite idle movement, and variable eccentric means upon said shaft for imparting said movement to said worm gearing thereby to rotate said driven element.

15. Transmission mechanism comprising in combination, a drive shaft, a driven element concentric therewith and having internal and external gears, one or more worms supported between and engaging said gears, and driving connections between said worm or worms and said drive shaft for imparting to and fro movement thereto along a path concentric with said drive shaft.

16. Transmission mechanism comprising in combination, a drive shaft, a driven element loose thereon having worms and outer and inner worm gears having teeth adapted to mesh with said worms, and means operatively connected to said drive shaft for imparting to and fro movement to said worms.

17. Transmission mechanism comprising in combination, a drive shaft, a driven element concentric therewith having outer and inner worm gears, and a series of segments operatively connected to said drive shaft and each carrying a worm adapted to mesh with the teeth of said worm gears.

18. Speed varying mechanism comprising in combination, a drive shaft, a driven element 38, cooperating means between said drive shaft and driven element including adjustable eccentrics 13, 13', gyratory rings 12$^A$, 12$^B$ on said eccentrics, means controlled by axial adjustment of said shaft to vary the adjustment of said eccentrics, segments 42$^A$, 42$^B$, 42$^C$ and 42$^a$, 42$^b$, 42$^c$ pivotally connected to said gyratory rings, and worms 48$^A$, 48$^B$, 48$^C$ and 48$^a$, 48$^b$, 48$^c$ carried by said segments for transmitting movement in one direction to said driven element.

19. Transmission mechanism including a drive shaft and a driven element, and intermediate devices cooperating therewith and including a worm in the form of a helix, the spires of which are formed to present threads differentiated with respect to one another.

20. Transmission mechanism including a drive shaft and a driven element, interposed connecting means including a worm comprising a helix, the spires of which present main and supplemental threads.

21. Transmission mechanism comprising a drive shaft, a driven element, and connecting means including worms having main threads provided with superficial supplemental threads.

22. Transmission mechanism comprising a drive shaft, a driven element, and connecting means including worms having main threads provided with superficial supplemental threads, said main and supplemental threads being of different pitch.

23. A worm for transmission mechanism provided with main threads having supplemental threads thereon.

24. A worm for transmission mechanism provided with main threads having supplemental threads thereon, said main and supplemental threads being of different pitch.

25. A driving device comprising a member having inner and outer worm gears, and one or more worms therebetween and adapted to mesh with both of said gears.

26. A driving device comprising a member having inner and outer worm gears, and one or more worms therebetween having main threads adapted to assume a driving relation with one of said worm gears, and supplemental threads adapted to assume an intermeshing relation with the other worm gear.

27. Transmission mechanism comprising a worm gear, a worm having main threads adapted to assume a driving, meshing relation therewith, said worm having supplemental threads, and a worm gear with which said supplemental threads mesh to impart rotative movement to said worm.

28. Transmission mechanism comprising a worm gear, a worm having main threads adapted to assume a driving, meshing relation therewith, said worm having supplemental threads, and a worm gear with which said supplemental threads mesh to impart rotative movement to said worm, and means to impart to and fro movement to said worm.

29. Transmission mechanism comprising a worm gear, a worm having main threads adapted to assume a driving, meshing relation therewith, said worm having supplemental threads, a worm gear with which said supplemental threads mesh to impart rotative movement to said worm, and means to impart to and fro arcuate movement to said worm.

30. Speed transmission mechanism comprising an element 39 having inner teeth 41 and outer teeth 47, and a plurality of worms 48$^A$, 48$^B$, 48$^C$ adapted to mesh therewith and provided with threads differentiated with respect to one another.

31. Transmission mechanism comprising a driven element 39 having a hub provided with a worm gear 41 and an internal worm gear 47, and a worm having threads differentiated with respect to one another adapted to mesh respectively with said worm gears 41 and 47.

32. Driving mechanism comprising in combination, an oscillatory worm comprising a helix, the spires of which present a locking, driving face and also a rotating face and a worm wheel co-operating with the locking face.

33. Driving mechanism comprising in combination an oscillatory worm provided with a locking, driving face and also with a rotating face, a worm wheel co-operating with the locking face, and means co-operating with the rotating face to effect therewith the rotation of the worm.

34. Driving mechanism comprising in combination, a driving worm wheel and an operating worm therefor, said worm having a locking driving engagement with the worm wheel and also having a worm face for rotating said worm, and means co-operating with said rotating worm face to effect rotation of the worm.

35. Variable speed transmission means comprising in combination rotatable driving and driven elements one of which has an abutment face formation; means relatively to adjust the axes of said elements into positions of greater or less eccentricity; and driving units distributed about the axes of said elements, each operatively connected with one of said elements and having circumferentially universally adjustable contact with said abutment face formation of the other, said contacted face being substantially normal to the line of driving thrust of said driving unit thereupon.

36. Variable speed transmission means comprising in combination rotatable driving and driven elements; means relatively to adjust the axes of said elements into positions of greater or less eccentricity; driving units distributed about the axes of said elements, each of said driving units being operatively connected with one of said elements and having universally adjustable, intermittently effective driving engagement with a face of the other of said elements, the thrust line of each driving unit lying within the angles of repose flanking a line normal to said face at the point of driving engagement.

37. In transmission mechanism, the combination of a worm gear and a co-acting, reciprocable worm having a main thread with a driving face the line of thrust of which upon the engaged gear surface lies within the angles of repose flanking a line normal to said surface, said worm also having a co-extensive thread to engage said gear, the line of thrust of said thread upon its engaged surface lying outside the angles of repose flanking a line normal to said surface.

38. Variable speed transmission means comprising in combination, rotatable driving and driven elements; means relatively to adjust the axes of said elements into positions of greater or less eccentricity; a group of driving units distributed about the axes of said elements and respectively connected with one of said elements and having intermittently effective driving engagement with the other, said group of driving units and said engaged element providing, one a plurality of engaging faces of limited extent for progressive, intermittently effective driving engagement with the other, said other providing for each driving unit a continuous face of a length to reach from one to another of the points of intermittently effective engagement of the cooperating face, the engagement being such that the line of driving thrust is always substantially normal to the engaged faces and whereby universality of adjustment of said points of normal engagement and of the resultant speed transmission may be had as determined by the relative eccentricity of said axes.

39. Transmission mechanism for converting constant rotary into variable speed rotary motion, comprising in combination an operatively associated train of elements including a rotary member, an annular member surrounding the axis thereof, an adjustable group of driving units distributed about the axis of said annular member and operatively engaged with said rotary member, said group of driving units and said annular member providing, one a plurality of engaging faces of limited extent for progressive, intermittently effective driving engagement with the other, said other providing for each driving unit a continuous face of a length to reach from one to another of the points of intermittently effective engagement of the cooperating face, and means to cause said group of driving units progressively to make intermittently effective engagement with and about said annular member thereby to produce rotation of one of said members with which they are engaged, said effective engagement being such that the line of driving thrust is always substantially normal to the engaged faces and whereby universality of adjustment of said points of normal engagement and of the resultant speed transmission may be had as determined by the adjustment of said group of driving units.

40. Transmission mechanism for converting constant rotary into variable speed rotary motion, comprising in combination an operatively associated train of elements including a rotary member, an annular member surrounding the axis thereof, an adjustable group of driving units having segmental portions and distributed about the axes of said members, each such unit having positive crank-like engagement with one of said members, and means to cause said group of driving units progressively to make intermittently effective direct abutting engagement with the other of said members and with the line of driving thrust substantially normal to the engaged surface thereof, thereby to produce rotation of one of said members with which they are engaged, the points of said abutting engagement being universally adjustable circumferentially about the axis of the contacted element.

In testimony whereof, I have signed my name to this specification, in the presence of two subscribing witnesses.

BICKNELL HALL.

Witnesses:
IRVING U. TOWNSEND,
ROBERT H. KAMMLER.